UNITED STATES PATENT OFFICE.

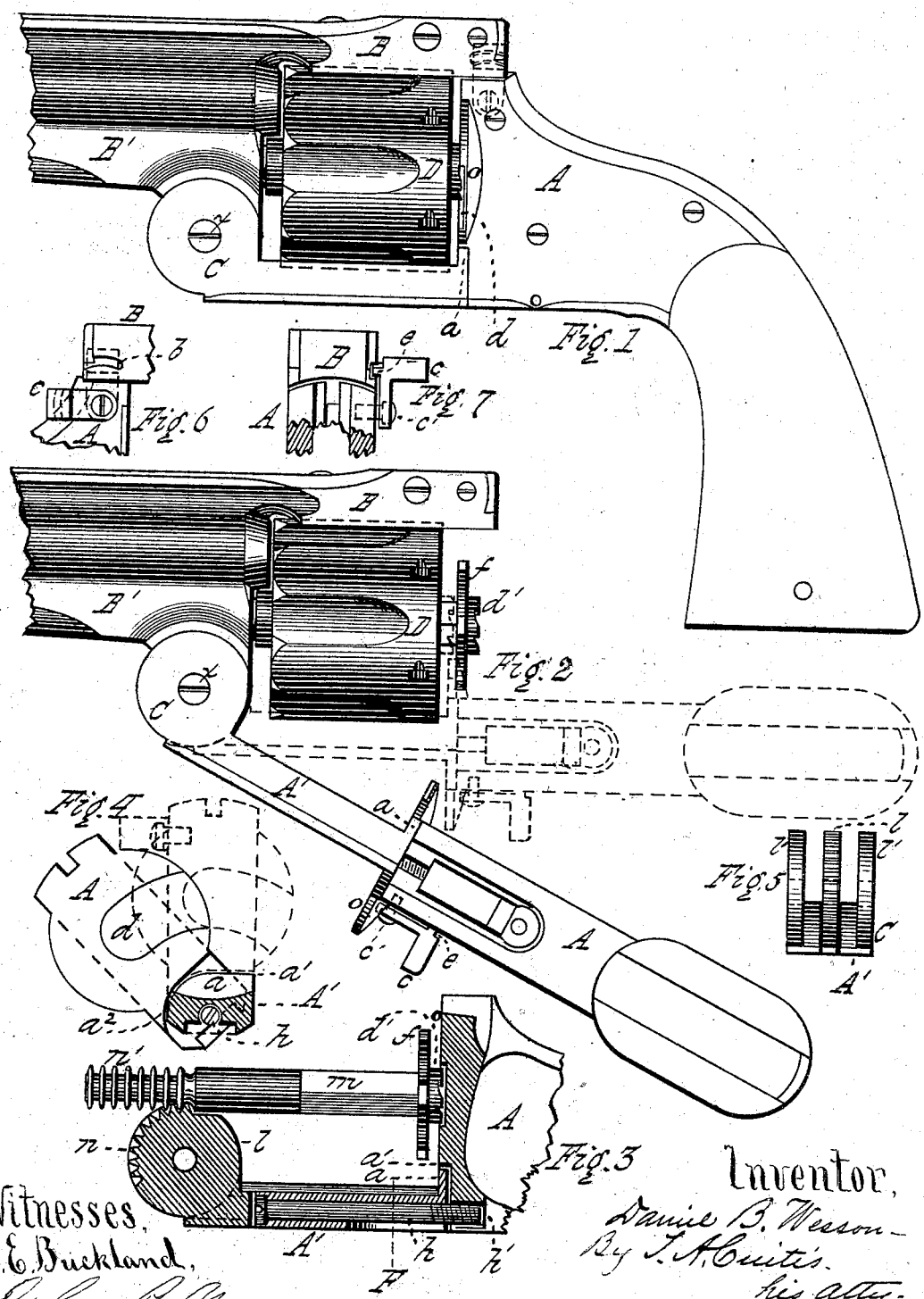

DANIEL B. WESSON, OF SPRINGFIELD, MASSACHUSETTS.

IMPROVEMENT IN REVOLVING FIRE-ARMS.

Specification forming part of Letters Patent No. 136,348, dated February 25, 1873.

*To all whom it may concern:*

Be it known that I, DANIEL B. WESSON, of Springfield, in the county of Hampden and State of Massachusetts, have invented a new and useful Improvement in Revolving Fire-Arms; and I do hereby declare that the following is a full, clear, and exact description thereof, reference being had to the accompanying drawing making a part of this specification, and to the letters of reference marked thereon, in which—

Figure 1 is a side view of my invention. Fig. 2 is a side view, showing the rear part of the frame unlocked from the barrel, and turned to one side and downward to extract the shells. Fig. 3 is a longitudinal vertical section through the middle of the frame, showing the method of jointing or pivoting that part of the frame which extends beneath the cylinder, and which operates the extractor, to that part located behind the cylinder. Fig. 4 is a vertical transverse section through the lower part of the frame, at line F of Fig. 3, showing a front view of the rear part of the frame, and the manner of pivoting the two parts of the frame together. Fig. 5 is a front-end view of the part beneath the cylinder, showing also the toothed piece which operates the extractor. Fig. 6 is a side view of a portion of the frame, showing the device for locking the barrel to the frame; and Fig. 7 is a rear view of the same.

My invention relates to that class of revolving fire-arms in which a chambered cylinder is used to contain the charges, which cylinder is made to revolve upon its bearing at the rear of the barrel, so that at each discharge the axis of one of the chambers of the cylinder is brought into a direct line with that of the barrel, and in which the barrel is locked to the frame or rear part of the arm whenever it is to be discharged, and is detached therefrom or unlocked whenever the cartridges are to be inserted into the chambers or the empty shells extracted therefrom; and my invention consists of devices, hereinafter described, whereby I am enabled to expose the rear end of the cylinder and operate the extractor by a positive movement in both directions.

That others skilled in the art may be able to make and use my invention, I will proceed to describe its construction and operation.

In the drawing, A is the rear part of the frame, which, as shown in Fig. 4, is recessed at $d$, which recess is made of sufficient size to receive the ratchet projection $d'$, and is made upon the arc of a circle concentric with the screw $h$ as a center, so that when the frame A is up in place at the rear of the extractor and its ratchet projection $d$, as shown in Fig. 3, said frame A may be turned to one side upon the screw $h$ as a pivot, allowing the face of the frame A to pass by the ratchet $d'$. The lower part of the face of the frame A is recessed also to a depth sufficient to receive the piece $a$ upon the rear end of the frame A', as shown in Fig. 3, and the upper part of this recess forms a shoulder, which upon one side of the frame is made upon the arc of a circle, of which the screw $h$ is the center, as shown at $a^2$, and upon the other side of the frame the shoulder is straight and horizontal, as shown at $a^1$ in Fig. 4, and the part $a$ upon the rear end of the frame A' is formed to correspond with the shoulder of said recessed part of the frame A. The frame A, which extends beneath the cylinder D, has a hole extending through its length, into which is inserted a screw, $h$, and the frame A has a threaded hole, $h'$, made therein, into which the screw $h$ is turned, thus securing the part A' to the part A, but in such manner that the frame A may be turned to one side, say, one-fourth of a revolution or more, the screw $h$ being turned out of the threaded hole $h'$ to that extent. The circular piece $l$, having the teeth $n$ made upon its periphery, is inserted in the joint C between the ears $l'$, and is there secured by the pivot $x$, and the front end of the extractor-shaft $m$ has the annular rings $n'$ made thereon, which engage with the teeth $n$ on the piece $l$, so that if the frame A were moved to one side, away from its position in rear of the extractor-plate $f$, any downward movement of the frame A' would cause the extractor-shaft $m$ and extractor-plate $f$ to be thrown backward. Upon one side of the frame may be pivoted the piece $c$ having a side projection, $e$, thereon, as shown in Figs. 6 and 7, and the rear end of the barrel B may have a recess, $b$, therein, so that when the piece $c$ is turned upon its pivot up into a vertical position the side projection $e$ enters the recess $b$ and secures the rear end of the barrel to the frame A. I do not, however, consider this fastening device as any important part of my invention, for there are many equivalent methods of securing the frame A up in place at the rear of the cylinder, any one of which may be used, and any convenient snap or catch device may be employed instead of that shown in the drawing.

The operation of my invention is as follows: The rear part of the frame A is unlocked from the rear end of the barrel, and is turned to one side upon the joint $a^1$, so that the recoil-plate shown at o is turned away from the rear end of the cylinder, when the cartridges may be inserted into the chambers. The part A is then turned back again, bringing the recoil-plate o back into its position at the rear of the cylinder, and the part A is locked to the barrel. After the arm is discharged the part A of the frame is again unlocked from the barrel and turned to one side, and the part A' of the frame turned upon the hinge-joint C, and away from the cylinder, which moves the extractor backward and forces the empty shells out at the rear end of the chambers of the cylinder. As the part A' is moved back to its position close to the cylinder, the extractor is thereby carried forward again to its position in the cylinder, and the rear part is turned up to its place in rear of the cylinder and locked to the rear of the barrel, as before.

By making the frame in two parts, A and A', and connecting them together at $a^1$ by a pivoted or swinging joint, I am enabled to turn the recoil-plate o away from the rear of the cylinder to insert the cartridges while the extractor is in its most forward position in the cylinder, or for any other purpose, even after the cartridges are inserted; and in accomplishing this object I am enabled to dispense with any spring arrangement for carrying the extractor back into its forward position in the cylinder after having been moved out, and am enabled to expose the rear end of the cylinder for any purpose whatever without moving the extractor, while, by moving the parts A and A' downward and away from the cylinder, I am also enabled to bring a positive force to bear upon the extractor, both in forcing it backward to extract the shells and in moving it forward again to its position in the cylinder; and these are the ojects sought and attained by the invention.

Instead of turning the rear part A of the frame away from the rear of the cylinder by a side movement, it may be found preferable to unite the two parts A and A' by a joint so constructed that the recoil-plate o may swing directly backward to expose the rear end of the cylinder, as the direction in which the recoil-plate is moved away from the cylinder is not at all an essential point, so long as the rear end of the cylinder is sufficiently exposed without operating the extractor.

It may be found, also, that in practice the toothed piece b may be made in one piece with the lower part A' of the frame with advantage as to expense and labor.

Having thus described my invention, what I claim as new, and desire to secure by Letters Patent, is—

The two parts A and A', hinged or jointed together, whereby the recoil-plate o may be turned away from the rear of the cylinder, in combination with the joint C, provided with the toothed piece l and the extractor m, substantially as set forth.

DANIEL B. WESSON.

Witnesses:
T. A. CURTIS,
C. E. BUCKLAND.